US012211385B2

(12) United States Patent
Puchalski et al.

(10) Patent No.: US 12,211,385 B2
(45) Date of Patent: Jan. 28, 2025

(54) DISTRIBUTED METHOD AND SYSTEM FOR VEHICLE IDENTIFICATION TRACKING (71) Applicant: Argo AI, LLC, Pittsburgh, PA (US)

(72) Inventors: Matthew Puchalski, Pittsburgh, PA (US); Michel Laverne, Pittsburgh, PA (US); Casey James Sennott, Pittsburgh, PA (US); Anthony R. McAlexander, Pittsburgh, PA (US)

(73) Assignee: VOLKSWAGEN GROUP OF AMERICA INVESTMENTS, LLC, Reston, VA (US)

(*) Notice: Subject to any disclaimer, the term of this patent is extended or adjusted under 35 U.S.C. 154(b) by 686 days.

(21) Appl. No.: 17/490,236

(22) Filed: Sep. 30, 2021

(65) Prior Publication Data
US 2023/0098880 A1 Mar. 30, 2023

(51) Int. Cl.
G08G 1/00 (2006.01)
G06F 8/65 (2018.01)
G07C 5/00 (2006.01)
H04L 9/32 (2006.01)
H04L 9/00 (2022.01)

(52) U.S. Cl.
CPC .............. G08G 1/202 (2013.01); G06F 8/65 (2013.01); G07C 5/008 (2013.01); H04L 9/32 (2013.01); H04L 9/50 (2022.05)

(58) Field of Classification Search
USPC ........................................................ 702/188
See application file for complete search history.

(56) References Cited

U.S. PATENT DOCUMENTS

| 9,305,407 | B1 | 4/2016 | Walton et al. |
| 9,646,290 | B2 | 5/2017 | Walton et al. |
| 9,654,458 | B1 | 5/2017 | Bhaktwatsalam et al. |
| 10,733,160 | B1 | 8/2020 | Leise et al. |
| 10,817,953 | B1 * | 10/2020 | Leise .................. G06Q 30/04 |
| 10,930,089 | B1 | 2/2021 | Leise et al. |
| 11,138,314 | B1 * | 10/2021 | Gettys ................. H04L 9/3239 |
| 2009/0025984 | A1 | 1/2009 | Buteaud et al. |
| 2009/0254240 | A1 | 10/2009 | Olsen, III et al. |
| 2009/0259841 | A1 | 10/2009 | Laberteaux et al. |
| 2009/0265455 | A1 | 10/2009 | Hiraki |
| 2014/0032824 | A1 | 1/2014 | Park |

(Continued)

OTHER PUBLICATIONS

Extended European Search Report for EP Patent Application No. 22198159.0 dated Jun. 9, 2023, 14 pages.

(Continued)

Primary Examiner — Paul D Lee
(74) Attorney, Agent, or Firm — Fox Rothschild LLP (57) ABSTRACT A fleet management system will receive, from each vehicle of a fleet of vehicles, a vehicle identification number (VIN). The system also will receive data elements that comprise: (a) vehicle operational parameters gathered during a run of the vehicle; (b) a hardware identification code that identifies a hardware component of the vehicle; and/or (c) a software identification code that identifies an installed software component in the vehicle. The processor will generate a data block that comprises the VIN and the one or more data elements. The processor will then save the data block to a shared digital ledger that includes VINs and data elements for a plurality of the vehicles in the fleet.

23 Claims, 6 Drawing Sheets (56) References Cited

U.S. PATENT DOCUMENTS

| | | |
|---|---|---|
| 2014/0282467 A1 | 9/2014 | Mueller et al. |
| 2014/0328248 A1 | 11/2014 | Greubel |
| 2015/0028134 A1 | 1/2015 | Hung |
| 2015/0281347 A1 | 10/2015 | Wang et al. |
| 2016/0028586 A1 | 1/2016 | Blair |
| 2016/0087804 A1 | 3/2016 | Park et al. |
| 2016/0285864 A1 | 9/2016 | Canavor et al. |
| 2017/0161973 A1* | 6/2017 | Katta ............... G06Q 40/08 |
| 2018/0014432 A1 | 1/2018 | Szarek |
| 2018/0144322 A1 | 5/2018 | Unnerstall |
| 2019/0004336 A1 | 1/2019 | Mori et al. |
| 2019/0043360 A1 | 2/2019 | Weinfield |
| 2019/0066407 A1 | 2/2019 | Kwak |
| 2019/0197798 A1 | 6/2019 | Abari et al. |
| 2019/0306149 A1 | 10/2019 | Vazquez Vidal et al. |
| 2019/0378352 A1* | 12/2019 | Dey ............... G07C 5/008 |
| 2020/0003384 A1 | 1/2020 | Rice |
| 2020/0033847 A1 | 1/2020 | Way et al. |
| 2020/0244655 A1 | 7/2020 | Gundavelli et al. |
| 2021/0022680 A1 | 1/2021 | Harris et al. |
| 2021/0209094 A1* | 7/2021 | Emery ............... G06F 17/40 |
| 2021/0226802 A1 | 7/2021 | Zhu et al. |
| 2021/0234670 A1 | 7/2021 | Leise et al. |

OTHER PUBLICATIONS

Baldini et al, Identity-based Security Systems for Vehicular ad-hoc Networks, IEEE, Dec. 6, 2013, pp. 672-678. (Year: 2013).

Coronado et al, Service Discovery and Service Access in Wireless Vehicular Netorks, IEEE, Dec. 4, 2008, pp. 1-6. (Year: 2008).

Partial European Search Report for European Patent Application No. 22198159.0 dated Feb. 23, 2023, 15 pages.

Google Groups, "MAC Address Binding to the Certificate" available at: https://groups.google.com/g/mailing.openssl.users/c/20ehH_uWARU?pli=1 printed on Sep. 16, 2020.

Wikipedia, "Dynamic Host Configuation Protocol", available at: https://en.wikipedia.org/wiki/Dynamic_Host_Configuration_Protocol printed on Dec. 15, 2020.

Deliotte, "Accelerating Technology Deisruptions in the Automotive Market, Blockchain in the Automotive Industry" 2018.

* cited by examiner

DISTRIBUTED METHOD AND SYSTEM FOR VEHICLE IDENTIFICATION TRACKING

BACKGROUND

A fleet of vehicles can include a variety of vehicles with different vehicle identification numbers (VINs), hardware components and configurations. Even fleet vehicles of the same make and model will differ from each other in various ways. For example, hardware components such as electronic control units (ECUs) and other processing devices, cameras, and LIDAR systems may have unique identifiers such as serial numbers and/or media access control (MAC) addresses. The components may be replaced over time, and software components of these systems will be updated over time. Calibration of vehicle sensors and other systems also will vary among vehicles in a fleet, as each vehicle's calibration is unique and will change over time.

It is important for fleet operators and managers to understand each vehicle's configuration at any given point in time. For example, if the fleet includes autonomous vehicles (AVs), the dispatching system needs to know how the AV is configured before the AV starts its journey. Operators also often need to analyze historical operating data to know how vehicles were configured during previous rides. In addition, some fleets may deploy a vehicle to multiple customers over time, and in such situations it is desirable to give each customer access to its own historical mission data without giving the customer access to data that relates to other users of the vehicle. Current dispatching and fleet management systems lack the ability to provide this information in real time, both to a fleet operator and its customers, while maintaining data security and integrity.

This document describes methods and systems that are directed to solving the problems described above, and/or other issues.

SUMMARY

In various embodiments, a processor of a fleet management system can be used to manage a fleet of vehicles. The processor will receive, from each vehicle of the fleet, a vehicle identification number (VIN) for the vehicle. The processor also will receive one or more data elements that comprise one or more of the following: (a) trip information comprising vehicle operational parameters gathered during a run of the vehicle; (b) a hardware identification code that identifies a hardware component of the vehicle; or (c) a software identification code that identifies an installed version of a software component that is installed in the vehicle. The processor will generate a data block that comprises the VIN and the one or more data elements. The processor will then save the data block to a shared digital ledger that includes VINs and data elements for a plurality of the vehicles in the fleet.

When the one or more data elements comprise a software identification code that identifies the installed version of the software component, a deployment service of the fleet management system may query the shared digital ledger to return the installed version, and the deployment service may access a data set of available software component updates. In response to the installed version being older than a corresponding available software component update that is in the data set, the deployment service may transfer the corresponding available software component to the vehicle for installation to replace the installed version.

In some embodiments, the processor may receive an updated VIN for any of the vehicles. Then this happens, the system may generate a new data block that comprises the updated VIN and the VIN that was previously saved to the shared digital ledger for the vehicle. The processor may then save the data block to the shared digital ledger.

In some embodiments, the one or more data elements that the processor receives may include: (a) first trip information comprising first vehicle operational parameters gathered during a first run of the vehicle that was performed on behalf of a first entity; and (b) second trip information comprising second vehicle operational parameters gathered during a second run of the vehicle that was performed on behalf of a second entity. When this happens, and when the processor then receives a request from the first entity for trip information, the processor may authenticate the first entity and using an access control policy to grant the first entity access to the first vehicle operational parameters but not the second vehicle operational parameters. The processor may then present the first vehicle operational parameters to the first entity. Optionally, the second vehicle operational parameters may include an identifier and trip information for a first passenger who requested a ride from the second entity. If so, then when the processor uses the access control policy to grant the first entity access to the first vehicle operational parameters but not the second vehicle operational parameters, the processor may ensure that the first entity does not have access to the identifier and the trip information for the first passenger. Alternatively, the second vehicle operational parameters may include a route taken by the vehicle during a delivery performed on behalf of the second entity, and if so then when the processor uses the access control policy to grant the first entity access to the first vehicle operational parameters but not the second vehicle operational parameters, the processor may ensure that the first entity does not have access to the route. In any of the options listed in this paragraph, the shared digital ledger optionally may be a permissioned ledger in which the fleet management system is permitted to access and save data to the shared digital ledger, and the first entity and the second entity may be permitted to access (but not save data to) the digital ledger.

In some embodiments, the one or more data elements that the processor receives may include the hardware identification code. The hardware identification code may identify a sensor of the vehicle. When this happens, and when the one or more data elements also include current calibration information for the sensor of the vehicle, the processor may query the shared digital ledger to return previous calibration information for the sensor of the vehicle. In response to the current calibration information deviating from the previous calibration information by at least a threshold, the processor may cause a calibration action to be performed on the sensor.

In some embodiments, each vehicle gathers data that it periodically transfers to an external system, and the one or more data elements may include log information indicating a status of transfer of the gathered data to the external system.

The methods described above may be embodied in a system and a memory containing programming instructions that are configured to cause the processor to implement the actions described above. Various embodiments also include a computer program product that contains such programming instructions.

DETAILED DESCRIPTION

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" (or "comprises") means "including (or includes), but not limited to." Definitions for additional terms that are relevant to this document are included at the end of this Detailed Description.

Figure 1:
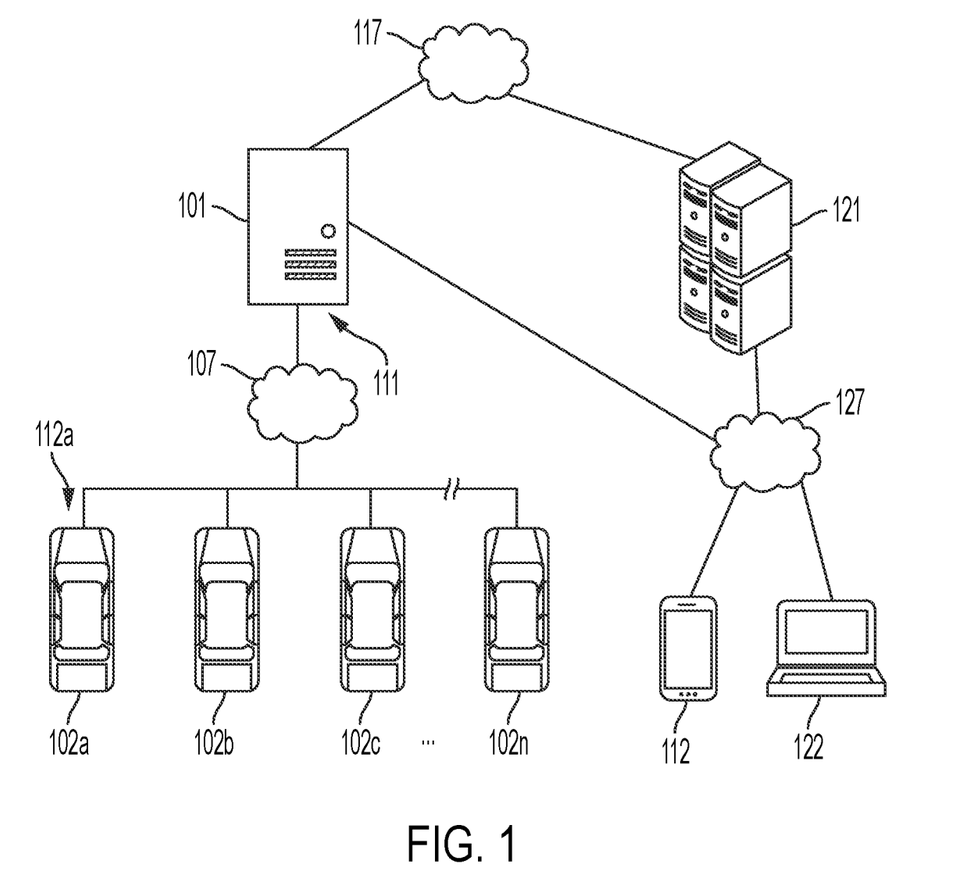
FIG. 1 illustrates an example system in which a distributed method of vehicle identification tracking may be used.

FIG. 1 illustrates an example system in which a distributed method of vehicle identification tracking may be used. A fleet of vehicles includes any number of vehicles 102a . . . 102n that are communicatively connected to a fleet management system 101 via one or more wired and/or wireless communication networks 107. Optionally, some or all of the vehicles 102a . . . 102n may be autonomous vehicles (AVs), and the fleet management system 101 may include a processor and a memory containing programming instructions configured to provide one or more services that may: (a) transfer software updates and data such as map updates or machine learning models to the vehicles 102a . . . 102n; (b) transfer operational instructions such as planned trajectories to the vehicles; and/or (c) receive data from the vehicles 102a . . . 102n. The data that the vehicles 102a . . . 102n may transfer to fleet management system 101 includes vehicle operating parameters (such as speed, engine temperature, and path traveled) and/or information gathered by the vehicle's perception system sensors (such as camera and/or LIDAR systems). The fleet management system 101 may be operated by a fleet dispatcher, or it may be operated by an independent service operator such as a parking garage operator, a vehicle service station or other operator that receives software updates and data from external services and transfers that material to vehicles when the vehicles connect to the independent service operator's system.

Each vehicle (such as vehicle 102a) will include a communication port 112a via which the device communicatively connects to the network 107. Similarly, one or more servers of the fleet management system 101 will include any number of communication ports 111 that operate as access portals to the service provider system via the network 107. The ports may be communication ports that are configured for a wired connection, such as an Ethernet port having a socket and contacts that are positioned to receive an Ethernet cable. In some embodiments, some or all of the ports may be configured for wireless connection, as in a BLUETOOTH or Wi-Fi connection, in which case the port would not include a socket but instead would include a transceiver that is configured to send and receive data wirelessly. In some embodiments, communication ports 111 may include a combination of both wired and wireless ports.

The fleet management system may exchange communications with one or more user electronic devices 112, 122 via one or more communication networks 117, 127. Example operators of user electronic devices 112, 122 include passengers of a fleet that includes vehicles of a ride-sharing or other transportation service. Other example operators of user electronic devices 112, 122 include businesses such as restaurants and product distributors that use the fleet as a delivery or cargo transport service. Other applications of the system are possible.

The fleet management system 101 and user electronic devices 112, 122 also may be in electronic communication with one or more network servers 121 that provide a data store for information such as vehicle configuration data in one or more shared digital ledgers, as will be described in more detail below. The shared digital ledger may be a distributed ledger in which data is replicated on multiple systems, or a centrally-managed ledger in which data is maintained on a single server. The shared digital ledger used in this system will typically be a permissioned ledger, in that changes to data stored on the ledger may only be made by authorized users. For example, the fleet management system 101 and/or the vehicles themselves 102a . . . 102n may be permitted to update the ledger upon presentation of a valid access credential, while users of external user electronic devices 112, 122 may be able to access and view certain stored data but not update it. A blockchain data structure is an example type of distributed ledger. A blockchain structure will be described below in the context of FIG. 3.

Figure 2:
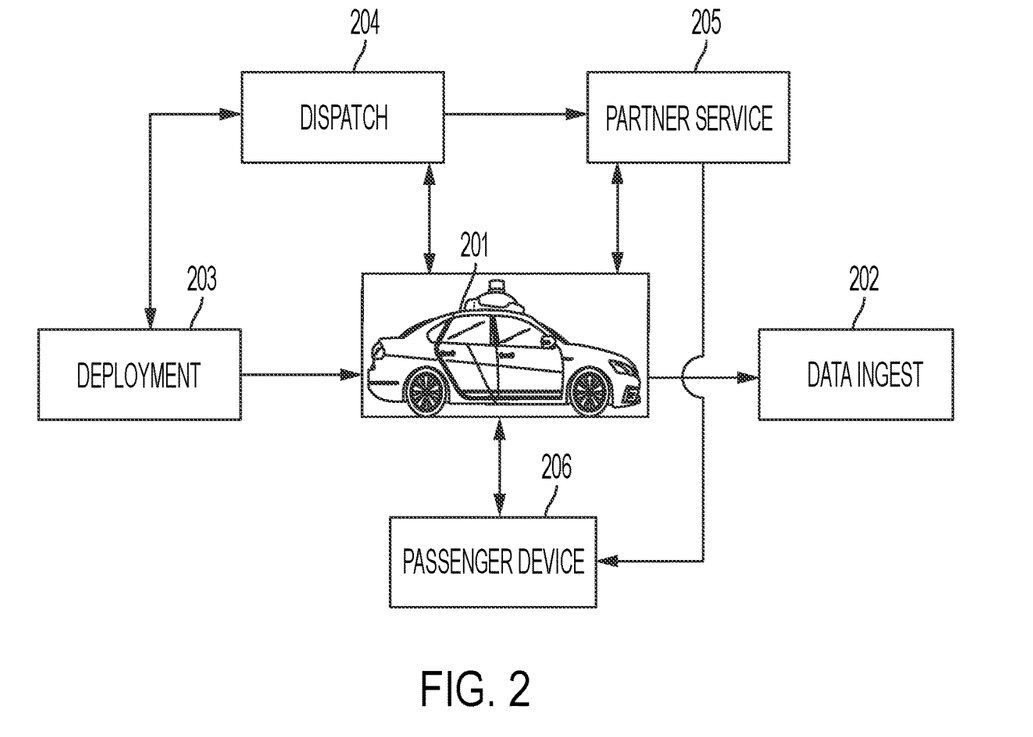
FIG. 2 illustrates example services that may exchange information with vehicle and/or each other.

FIG. 2 illustrates various services that may generate, receive, and/or share data with a vehicle 201 during or after a run of the vehicle in an environment. Each service includes a processor and software module with programming instructions that enable the processor to exchange relevant communications with the vehicle 201, either directly or indirectly through one or more communication networks. Some of the services may be part of a single system (such as the fleet management system 101 of FIG. 1) that may share one or more processors and memory devices, and some may be separate from the other services.

The services may include a data ingestion service 202 that pulls information from the vehicle and transfers some or all of it to the data store. When the vehicle 201 communicatively connects to the data ingestion service 202, the vehicle may transfer its vehicle identification number (VIN) to the data ingestion service 202. The data ingestion service 202 will include or have access to a database of VINs and, for each VIN, identifiers for the vehicle's hardware, installed software, and/or operating data. The data ingestion service 202 may query the vehicle 201 for updates to any or all of this data. Alternatively, the vehicle 201 may present some or all of this data to the data ingestion service 202. For example, when the vehicle 202 completes a run, it may transfer data captured by its sensors (such as perception data and/or LIDAR data), vehicle system parameters (such as sensor calibration status, speeds achieved, distance traveled, etc.) and/or other operating data to the data ingestion service 202. The data ingestion service may upload some or all of this data to the shared ledger for storage in association with the VIN. Optionally, a vehicle's VIN may change, and if so the vehicle 201 may notify the data ingestion service 202 of this. The data ingestion service 202 may then transfer the new VIN to the shared ledger, optionally in association with the previous VIN so that the vehicle's configuration information will now be associated with the new VIN.

The services may include a deployment service 203 that operates to deploy software updates to the vehicle 201. (This document will use the term "software" to include any digital programming instructions or data sets that may be transferred to and used by the vehicle.) A deployment service 203 will include or have access to software and/or data (such as map data) that is to be transferred to one or more of the vehicle's components. The deployment service 203 will need to understand what hardware components are currently installed on the vehicle 201b, as well as the version of each software module that is currently deployed on the vehicle 201, to identify the software updates that the vehicle is eligible for and requires. As will be described below, the deployment service 203 may query the shared ledger for this information. The deployment service may be an element of the fleet management system, or it may be an element of a third-party service that the fleet manager permits to maintain the vehicle with up-to-date software releases. When the deployment service 203 deploys a software update to the vehicle, it may upload the software configuration with the vehicle's VIN to the shared ledger, either directly or indirectly via one of the other services.

The services may include a dispatch service 204 which provides the function of a dispatcher to the vehicle 201 and other vehicles in the fleet. The dispatch service 204 may dispatch trip information such as a pickup location, drop-off location, and/or route to the vehicle 201. Optionally, the dispatch service 204 may also communicate with one or more of the other services such as the deployment service 203 to receive and/or exchange information about current map data or vehicle configuration information.

The services that communicate with the vehicle 201 may include a service of a partner electronic device 205. The partner operating the partner service electronic device 205 will be operated by an entity that requests one or more vehicles of the fleet to transport and deliver products, cargo and/or other items. The entity may be a retail or wholesale product distributor, a restaurant, a ride sharing service operator, or any other entity on whose behalf the fleet management service is operating the vehicle 201 at the time. The partner service electronic device 205 may receive and/or exchange information with other services. For example, partner service electronic device 205 may receive a vehicle's current configuration information and/or map data from the dispatch service 204 and/or deployment service 203.

The services that communicate with the vehicle 201 may also include an application of a passenger electronic device 206. The passenger electronic device 206 may include a software application that the passenger can use to verify the passenger's identity to the vehicle 201. The application also may be configured to receive a confirmation message from the vehicle 201 confirming that the vehicle 201 is in fact intended for that passenger. For example, when a user of the passenger electronic device 206 requests a ride, the application may generate a bar code, matrix code, or other displayable code that can be displayed on the device's display screen. The code will be stored in a remote server (such as a server of a partner service 205) in association with the passenger's account. When the vehicle 201 reaches the passenger pick-up location, the vehicle 201 or an electronic device carried by the vehicle's operator may use a barcode scanner to scan the code from the passenger device 206. The vehicle or electronic device may then query the remote server to verify that the code is that of the passenger who requested the ride. If (and only if) the passenger is verified, the vehicle may then accept the passenger and travel along a path to the passenger's destination.

Figure 3:
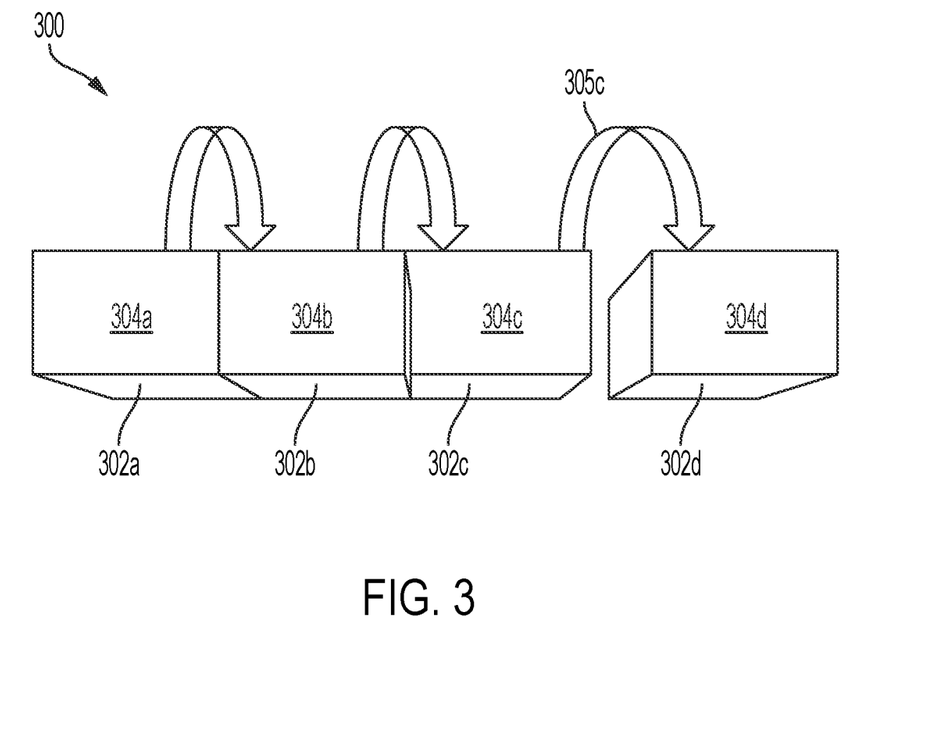
FIG. 3 illustrates an example digital ledger data structure, and in particular a blockchain structure.

FIG. 3 illustrates an example blockchain data structure according to various embodiments. A blockchain 300 includes one or more blocks 302a-c. Each block may include one or more data log records 304a-c. As new data log records are generated, a corresponding data representation 304d of those data log records may be added to the blockchain 300 as part of a new block 302d. As such, blocks 302a-d of the blockchain 300 may be positioned in a linear, sequential order. For example, blocks may be arranged in a chronological order.

As each new block is added to the blockchain 300, the new block's data will include a hash of the immediately previous block. For example, as shown in FIG. 3 when block 302d is added to the blockchain 300, it may include a cryptographic hash 305c or a signature of block 302c. Thus, in a blockchain 300, each successive transaction record is linked to its immediately preceding record with a one-way cryptographic hash. Coupled with process known as "proof of work" and a distributed consensus system, data written to a blockchain is extremely resistant to changes of any kind.

Optionally, one or more blocks 302a-d of a blockchain 300 may occupy the same memory device space. Alternatively, a blockchain 300 may be distributed across multiple memory devices. For instance, some of the blocks 302a-d may be stored in a data store that is associated with a first electronic device in a first location, while other blocks of the blockchain 300 may be stored in a different data store that is associated with a second electronic device in a second location that is different from the first location. Despite this distributed storage arrangement, the blocks 302a-d may still form the blockchain 300 as they are linked to one another such as, for example, by way of their cryptographic hashes.

In various embodiments, one or more participants of the system (fleet managers, potential passengers, and/or other authorized users) may have a key pair that each may use to communicate and/or verify or authenticate communications and other information shared throughout the system. The key pair may include a private key and a public key associated with each participant. A participant may generate its own public and private keys. For example, a system associated with a participant may include a key generator, such as, for example, a random key generator, which may generate a public/private key pair for the participant. All client electronic devices associated with the participant may utilize the same public/private key pair in its communications with the system in order to uniquely authenticate itself as part of the participant's network. It is understood that client electronic devices associated with a participant may use different public/private key pairs in some embodiments, each associated with the participant. In various embodiments, one or more electronic devices associated with a participant (e.g., one or more client electronic devices) may store a generated key pair in a secure data store associated with such device.

In various embodiments, each participant of the system may provide its public key to the system. The system may store one or more public keys and an indication of the participant to which it belongs in one or more data stores such as, for example, a key store. The system may utilize a key store to authenticate communications via the system and determine which data a user is permitted to access. For example, when a partner service electronic device attempts to access information stored on the shared ledger, a data store that stores the shared ledger may retrieve the partner service's public key from the key store. The data store may use the public key to attempt to decrypt a portion of the partner service's communication. If the public key cannot decrypt the information, then the system may reject the inquire from the partner service device. However, if the public key successfully decrypts the information, then the system can be confident that the partner service is who it claims to be. The system may then provide the partner service device with access to the information which the partner service is authorized to access.

To ensure that a requesting entity only gets access to information that it is authorized to view, the system may associate an access policy with the distributed ledger. An access policy is a list, table, or other data structure that identifies privileges or permission that apply to a particular data element or set of data elements. An access control list (ACL) is an example of an access policy. Before granting a requesting entity access to a particular data element in the ledger, the system may query or inspect the access control policy to ensure that the policy stores data that associates the requesting entity with that data element. If the association is stored in the policy, the requesting entity is permitted to access the data element. If the association is not stored in the policy, the system will not give the requesting entity access to that data element.

Figure 4:
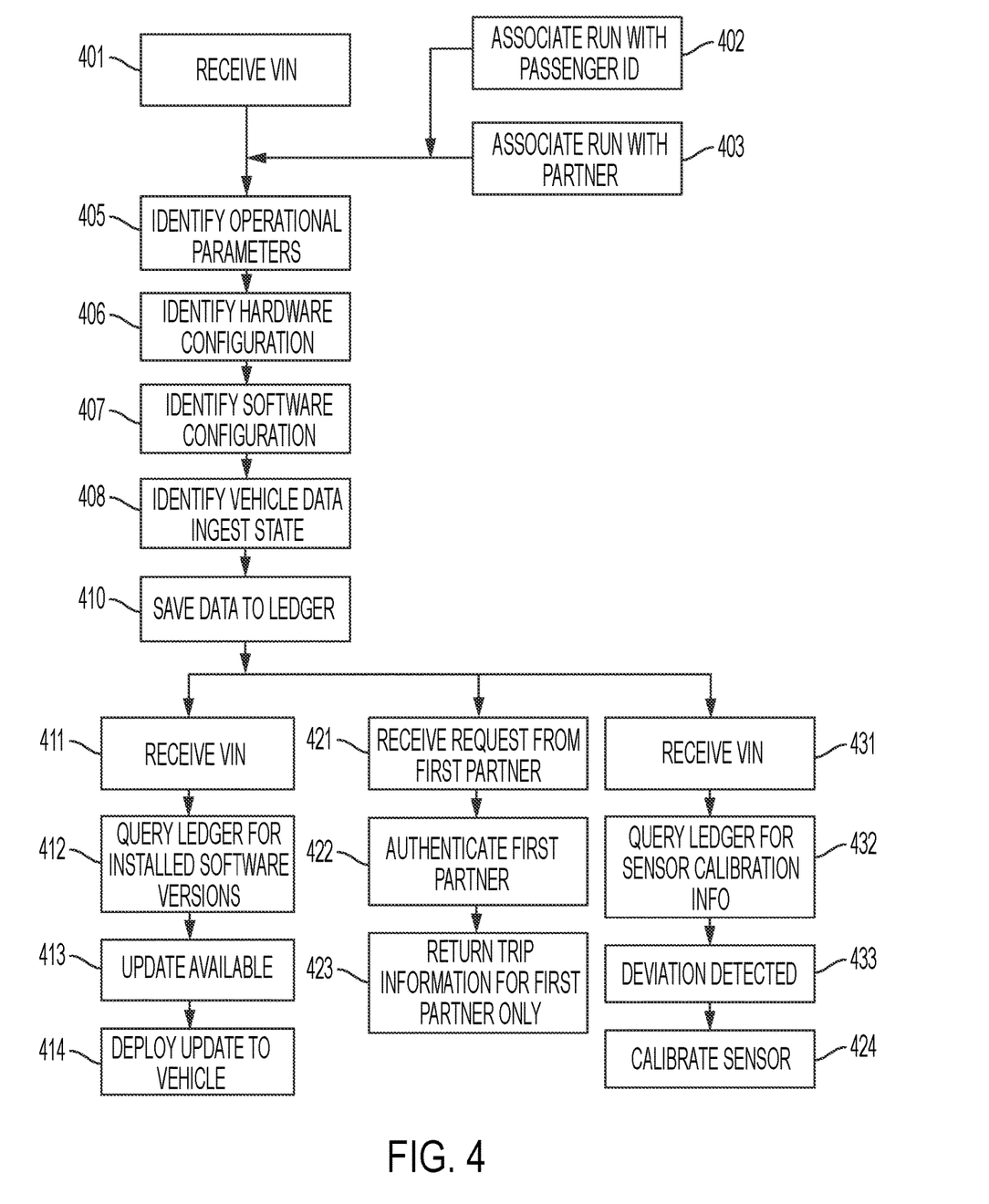
FIG. 4 is a flowchart illustrating various applications of the vehicle identification tracking systems described in this document.

FIG. 4 is a flowchart illustrating various possible applications of the vehicle information tracking system described above. At 401 the data ingestion service, the dispatch service or another component of the vehicle management system will receive, from any of the vehicle of a fleet of vehicles that it manages, a VIN for the vehicle. The system may receive this information when the vehicle communicatively connects to the system, such as when the vehicle's communication port is plugged into an Ethernet, RS-232 or other data transfer connection of a fleet management system. Alternatively, the communication may occur via a BLU-ETOOTH, Bluetooth 2.0, Wi-Fi, vehicle-to-infrastructure (V2I), vehicle-to-network (V2N), or other near-field or short range communication protocol.

The system will also receive one or more additional data elements from the vehicle. For example, at 405 the system may receive trip information comprising vehicle operational parameters gathered during a run of the vehicle. The trip information may include a route that the vehicle took during the run, a time of the run, and/or vehicle system parameters such as vehicle speed, images and/or LIDAR data captured by vehicle sensors, or other information. Optionally, if the run was to carry a passenger, then at 402 the system may receive an identifier for the passenger and at 405 it may associate the passenger ID with the operational parameters. Possible methods of receiving a passenger ID are described above. In addition, as noted above some vehicles may operate on behalf of different partners at different times of day. By way of example, a vehicle may operate on behalf of a package delivery service in the morning and a passenger ride-sharing service in the afternoon. If so, then at 403 the system may associate each run with an identifier of the partner on whose behalf the vehicle operated. Then, at 405 it may associate the partner ID with the operational parameters for that run.

As another example, at 406 the system may receive a hardware configuration information for hardware component of the vehicle. The configuration information may include an identification code for the component (such as a serial number or MAC address), an installation data and/or last service date, or other information.

As another example, at 407 the system may receive a software identification code that identifies an installed version of a software component that is installed in the vehicle. The software component may be a digital map, a module of a vehicle subsystem, or any other software component of the vehicle.

As another example, at 408 the system may receive a vehicle data ingest state, which identifies the status of receipt and/or offboarding of data that is required by one or more external systems. For example, AVs have onboard storage that record information such as sensor data, time spent in autonomy vs human-operated driving, components that are required for regulatory reporting, and other data will be transferred to one or more systems. This data will periodically be transferred off of the vehicle and to an external server (which may be locally hosted or something in the cloud). The AV may record a log of the information transferred, offloading success/failure status, space available on the logging system, time of transfer and related information.

Regardless of the information received, at 410 the system will generate a data block that comprises the VIN and the one or more data elements, and it will save the data block to a shared digital ledger that includes VINs and data elements for multiple vehicles in the fleet. The data block may encompass a single data element for a single vehicle, multiple data elements for a single vehicle, or multiple data elements for multiple vehicles. As described above in FIG. 3, each new data block may include a hash or signature of the immediately preceding data block in the chain to ensure that the data block cannot be altered without detection. The shared digital ledger will be distributed across multiple servers, and the updated data block will be saved to each copy of the ledger.

Optionally, before adding a data block to the ledger, the system may require the block to be validated by creating a proof of work. The system may create a proof of work for the block using any of various methods. For example, the system may add a nonce (a random number) to the block data, then hash the block data. If the hash fails to meet the needs of the proof of work, the nonce is changed and a new hash is made. Because of the nature of hashing, the new hash will be completely different form the old one. This process may be repeated until the resulting hash passes the test. An example test for a proof of work may convert the generated hash value into a number in binary format (1's and 0's) and compare that number to a target value. If the number is less than the target value, the proof of work passes the test. If it is greater than that target number the proof of work would fail. Alternate methods of proof of work include more complex mathematical operations, such as generating a valid series of prime numbers. The system may use methods of proof of work that have been developed to date, as well as those that may be developed in the future.

Blocks 411-414 describe a process that a deployment service of a fleet management system may follow when a vehicle communicates with the system. As noted above, the deployment service will include or have access to a database of software updates that are to be installed on one or more vehicles of the fleet. When a vehicle connects to the deployment service and shares its VIN with the service at 411, the service will query the shared digital ledger to return identifiers for one or more installed versions at 412. The service will determine whether an update is available for any installed version at 413 by determining whether any installed version is older than a corresponding available software component update that is in the data set. When this happens, at 414 the deployment service will deploy the update by transferring the corresponding available software component to the vehicle for installation to replace the installed version.

Blocks 421-423 describe a process that a deployment service of a fleet management system may use to ensure that partners can access only information that is associated with their use of a vehicle, and not information associated with other partners who may have used the vehicle. In these situations, the operational parameters received at 405 may include first vehicle operational parameters gathered during a first run of the vehicle that was performed on behalf of a first partner entity, and second vehicle operational parameters gathered during a second run of the vehicle that was performed on behalf of a second partner entity. The operational parameters for each run may include routes taken, times of operation, passenger identifiers, or other data. When the first partner entity requests trip information at 421, the system may authenticate the first partner entity at 422 and only permit the first partner entity access to any data if and after authentication occurs. Example authentication processes are described above in the context of FIG. 3. At 423 the system may then use an access control policy to grant the first entity access to the operational parameters for runs that are associated with the first partner entity, but not for runs associated with the second partner entity or any other entity. The system will then present the first partner entity with operational data for runs with which the first partner entity is associated.

Blocks 431-434 describe a process by which the system may determine whether one or more sensors of the vehicle require calibration. the hardware identification code identifies a sensor of the vehicle; When a vehicle connects to the deployment service and shares its VIN with the service at 431, the hardware configuration shared at 406 may include currently-existing calibration parameters for one or more sensors. The service will query the shared digital ledger to return previous calibration parameters those sensors at 432. The service will determine whether any of the current calibration information deviates from the previous calibration information by at least a threshold at 433. An example threshold may be an amount of time that lapsed since the last calibration, a vehicle distance traveled since last calibration, or a difference between one or more current and previous sensor parameters. If the deviation exceeds a threshold, the system will cause a calibration action to be performed on the sensor at 434. The system may cause calibration to occur by generating a signal to an external service that will perform the calibration, or by initiating a self-calibration process in a system of vehicle.

As another example, if the VIN received at 401 for a vehicle is an updated VIN, then when the system saves the data to the ledger at 409 it may generate a data block that comprises the updated VIN and the VIN that was previously saved to the shared digital ledger for the vehicle.

Figure 5:
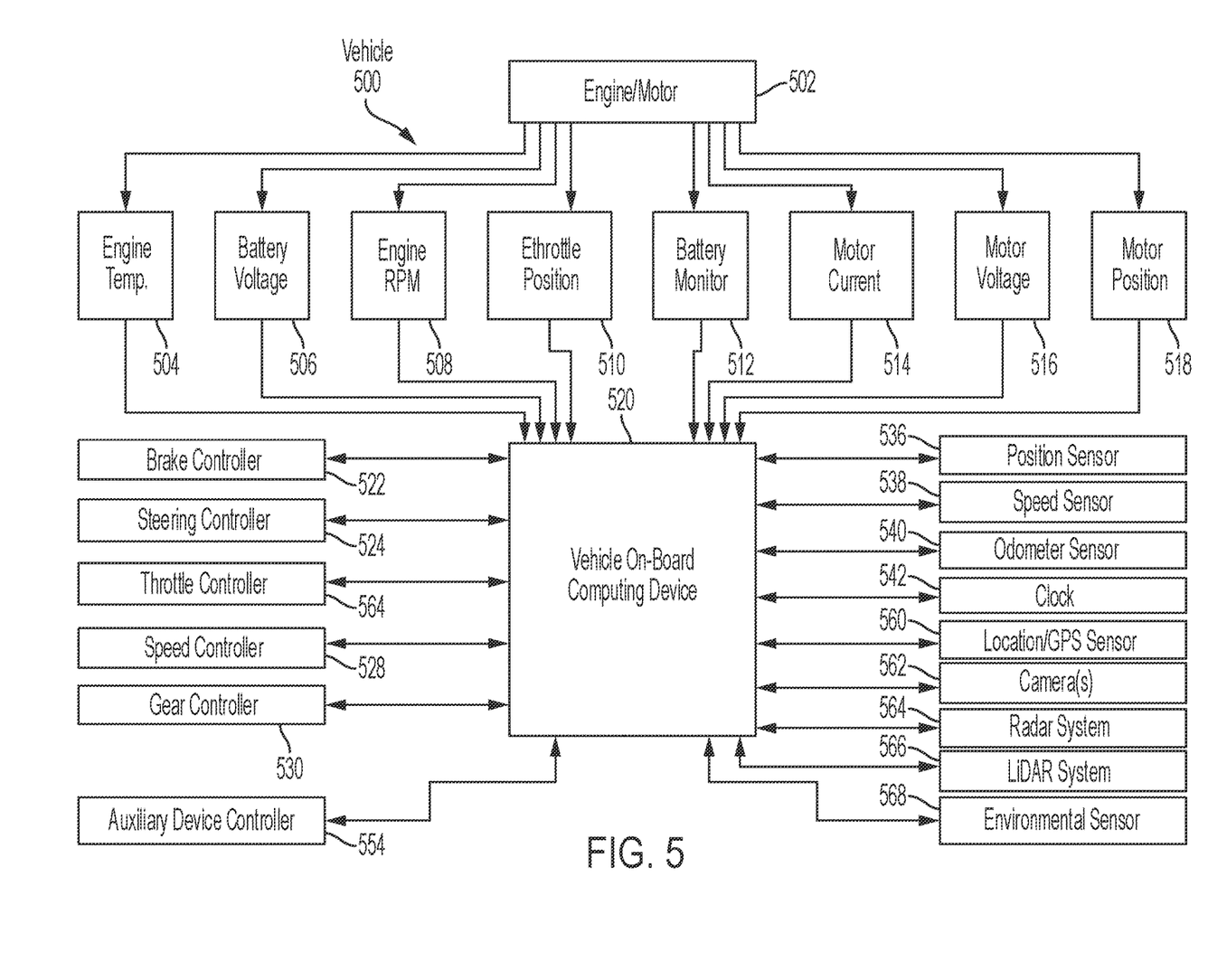
FIG. 5 is a diagram of example components and systems of a vehicle.

FIG. 5 illustrates an example system architecture 500 for a vehicle. As shown in FIG. 5, the vehicle 500 includes an engine or motor 502 and various sensors 504-518 measuring various parameters of the vehicle. In gas-powered or hybrid vehicles having a fuel-powered engine, the sensors may include, for example, an engine temperature sensor 504, a battery voltage sensor 506, an engine rotations per minute (rpm) sensor 508, and a throttle position sensor 510. If the vehicle is an electric or hybrid vehicle, then the vehicle may have an electric motor, and accordingly will have sensors such as a battery monitoring system 512 (to measure current, voltage and/or temperature of the battery), motor current 514 and temperature 516 sensors, and motor position sensors such as resolvers and encoders 518.

Operational parameter sensors that are common to both types of vehicles include, for example: a position sensor 536 such as an accelerometer, gyroscope and/or inertial measurement unit; a speed sensor 538; and an odometer sensor 540. The vehicle also may have a clock 542 that the system uses to determine vehicle time during operation. The clock 542 may be encoded into the vehicle on-board computing device, it may be a separate device, or multiple clocks may be available.

The vehicle also will include various sensors that operate to gather information about the environment in which the vehicle is traveling. These sensors may include, for example: a location sensor 560 such as a global positioning system (GPS) device; object detection sensors such as one or more cameras 562; a LIDAR sensor system 566; and/or a radar system 564. The sensors also may include environmental sensors 568 such as a precipitation sensor and/or ambient temperature sensor. The object detection sensors may enable the vehicle on-board computing device 520 to detect objects that are within a given distance range of the vehicle 500 in any direction, while the environmental sensors collect data about environmental conditions within the vehicle's area of travel.

During operations, information is communicated from the sensors to the on-board computing device 520. The on-board computing device 520 analyzes the data captured by the sensors, and optionally controls operations of the vehicle based on results of the analysis. For example, the on-board computing device 520 may control: braking via a brake controller 522; direction via a steering controller 524; speed and acceleration via a throttle controller 526 (in a gas-powered vehicle) or motor speed controller 528 (such as a current level controller in an electric vehicle); a differential gear controller 530 (in vehicles with transmissions); and/or other controllers.

Geographic location information may be communicated from the location sensor 560 to the on-board computing device 520, which may then access a map of the environment that corresponds to the location information to determine known fixed features of the environment such as streets, buildings, stop signs and/or stop/go signals. Captured images from the camera(s) 562 and/or object detection information captured from sensors such as a LIDAR system is communicated to the on-board computing device 520. The object detection information and/or captured images are processed by the on-board computing device 520 to detect objects in proximity to the vehicle 500. Any known or to be known technique for making an object detection based on sensor data and/or captured images can be used in the embodiments disclosed in this document.

In the various embodiments discussed in this document, the description may state that the vehicle or on-board computing device of the vehicle may implement programming instructions that cause the on-board computing device of the vehicle to make decisions and use the decisions to control operations of one or more vehicle systems. However, the embodiments are not limited to this arrangement, as in various embodiments the analysis, decision-making and or operational control may be handled in full or in part by other computing devices that are in electronic communication with the vehicle's on-board computing device. Examples of such other computing devices include an electronic device (such as a smartphone) associated with a person who is riding in the vehicle, as well as a remote server that is in electronic communication with the vehicle via a wireless communication network. The processor of any such device may perform the operations that will be discussed below.

Figure 6:
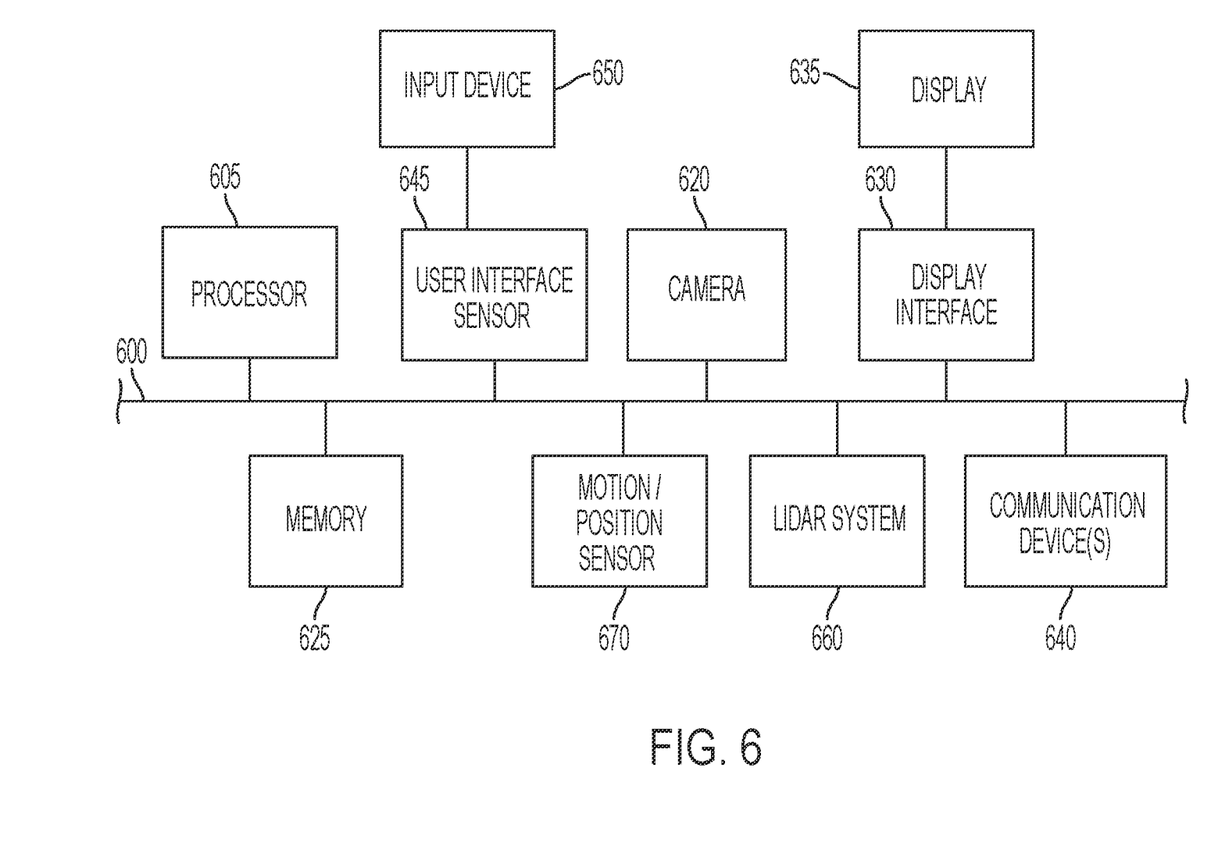
FIG. 6 is a block diagram that illustrates various elements of an electronic subsystem of a vehicle, a fleet management system, and/or another electronic device.

FIG. 6 depicts an example of internal hardware that may be included in any of the electronic components of the system, such the fleet management server, any server that stores the shared ledger, or any user electronic device. An electrical bus 600 serves as an information highway interconnecting the other illustrated components of the hardware. Processor 605 is a central processing device of the system, configured to perform calculations and logic operations required to execute programming instructions. As used in this document and in the claims, the terms "processor" and "processing device" may refer to a single processor or any number of processors in a set of processors that collectively perform a set of operations, such as a central processing unit (CPU), a graphics processing unit (GPU), a remote server, or a combination of these. Read only memory (ROM), random access memory (RAM), flash memory, hard drives and other devices capable of storing electronic data constitute examples of memory devices 625. A memory device may include a single device or a collection of devices across which data and/or instructions are stored. Various embodiments may include a computer-readable medium that contains programming instructions that are configured to cause one or more processors to perform the functions described in the context of the previous figures.

An optional display interface 630 may permit information from the bus 600 to be displayed on a display device 635 in visual, graphic or alphanumeric format, such as an in-dashboard display system of the vehicle. An audio interface and audio output (such as a speaker) also may be provided. Communication with external devices may occur using various communication devices 640 such as a wireless antenna, a radio frequency identification (RFID) tag and/or short-range or near-field communication transceiver, each of which may optionally communicatively connect with other components of the device via one or more communication system. The communication device(s) 640 may be configured to be communicatively connected to a communications network, such as the Internet, a local area network or a cellular telephone data network.

The hardware may also include a user interface sensor 645 that allows for receipt of data from input devices 650 such as a keyboard or keypad, a joystick, a touchscreen, a touch pad, a remote control, a pointing device and/or microphone. Digital image frames also may be received from a camera 620 that can capture video and/or still images. The system also may receive data from a motion and/or position sensor 670 such as an accelerometer, gyroscope or inertial measurement unit. The system also may include and receive data via a LiDAR system 660, when used in the context of autonomous vehicles.

The features and functions described above, as well as alternatives, may be combined into many other different systems or applications. Various components may be implemented in hardware or software or embedded software. Various presently unforeseen or unanticipated alternatives, modifications, variations or improvements may be made by those skilled in the art, each of which is also intended to be encompassed by the disclosed embodiments.

Terminology that is relevant to the disclosure provided above includes:

The term "vehicle" refers to any moving form of conveyance that is capable of carrying either one or more human occupants and/or cargo and is powered by any form of energy. The term "vehicle" includes, but is not limited to, cars, trucks, vans, trains, autonomous vehicles, aircraft, aerial drones and the like. An "autonomous vehicle" is a vehicle having a processor, programming instructions and drivetrain components that are controllable by the processor without requiring a human operator. An autonomous vehicle may be fully autonomous in that it does not require a human operator for most or all driving conditions and functions. Alternatively, it may be semi-autonomous in that a human operator may be required in certain conditions or for certain operations, or that a human operator may override the vehicle's autonomous system and may take control of the vehicle. Autonomous vehicles also include vehicles in which autonomous systems augment human operation of the vehicle, such as vehicles with driver-assisted steering, speed control, braking, parking and other advanced driver assistance systems.

A "run" of a vehicle refers to an act of operating a vehicle and causing the vehicle to move about the real world. A run may occur in public, uncontrolled environments such as city or suburban streets, highways, or open roads. A run may also occur in a controlled environment such as a test track.

An "electronic device" or a "computing device" refers to a device that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions. A "service", such as the deployment service and the data ingestion service described above, is a computing device that is programmed to perform at least the functions that are described above for that service.

The terms "memory," "memory device," "computer-readable medium," "data store," "data storage facility" and the like each refer to a non-transitory device on which computer-readable data, programming instructions or both are stored. Except where specifically stated otherwise, the terms "memory," "memory device," "computer-readable medium," "data store," "data storage facility" and the like are intended to include single device embodiments, embodiments in which multiple memory devices together or collectively store a set of data or instructions, as well as individual sectors within such devices. A computer program product is a memory device with programming instructions stored on it.

The terms "processor" and "processing device" refer to a hardware component of an electronic device that is configured to execute programming instructions, such as a microprocessor or other logical circuit. A processor and memory may be elements of a microcontroller, custom configurable integrated circuit, programmable system-on-a-chip, or other electronic device that can be programmed to perform various functions. Except where specifically stated otherwise, the singular term "processor" or "processing device" is intended to include both single-processing device embodiments and embodiments in which multiple processing devices together or collectively perform a process.

In this document, the terms "communication link" and "communication path" mean a wired or wireless path via which a first device sends communication signals to and/or receives communication signals from one or more other devices. Devices are "communicatively connected" if the devices are able to send and/or receive data via a communication link. "Electronic communication" refers to the transmission of data via one or more signals between two or more electronic devices, whether through a wired or wireless network, and whether directly or indirectly via one or more intermediary devices.

A "shared digital ledger" is a set of digital data that is stored and shared with a set of users who are authorized to access it. A shared digital ledger may be centrally managed and stored on a single server or a limited number of servers. Alternatively, a shared digital ledger may be a "distributed ledger" in that that is replicated, shared, and synchronized across multiple computing devices and/or systems. A distributed ledger will be made available for multiple users to access via multiple servers, each of which has access to an identical copy of the ledger. A blockchain data structure is an example type of distributed ledger.

A "vehicle identification number" (VIN) is an alphanumeric code that is assigned to a vehicle uniquely assigned to a vehicle. A VIN may be assigned by the vehicle's manufacturer, a fleet operator, or another entity. A vehicle may store its VIN in memory and present the VIN to a fleet management server when the vehicle communicatively connects with the server. No two vehicles that communicate with the fleet management server will share the same VIN.

A "machine learning model" or a "model" refers to a set of algorithmic routines and parameters that can predict an output(s) of a real-world process (e.g., prediction of an object trajectory, a diagnosis or treatment of a patient, a suitable recommendation based on a user search query, etc.) based on a set of input features, without being explicitly programmed. A structure of the software routines (e.g., number of subroutines and relation between them) and/or the values of the parameters can be determined in a training process, which can use actual results of the real-world process that is being modeled. Such systems or models are understood to be necessarily rooted in computer technology, and in fact, cannot be implemented or even exist in the absence of computing technology. While machine learning systems utilize various types of statistical analyses, machine learning systems are distinguished from statistical analyses by virtue of the ability to learn without explicit programming and being rooted in computer technology.

In this document, when relative terms of order such as "first" and "second" are used to modify a noun, such use is simply intended to distinguish one item from another, and is not intended to require a sequential order unless specifically stated.

In addition, terms of relative position such as "vertical" and "horizontal", or "front" and "rear", when used, are intended to be relative to each other and need not be absolute, and only refer to one possible position of the device associated with those terms depending on the device's orientation. When this document uses the terms "front," "rear," and "sides" to refer to an area of a vehicle, they refer to areas of vehicle with respect to the vehicle's default area of travel. For example, a "front" of an automobile is an area that is closer to the vehicle's headlamps than it is to the vehicle's tail lights, while the "rear" of an automobile is an area that is closer to the vehicle's tail lights than it is to the vehicle's headlamps. In addition, the terms "front" and "rear" are not necessarily limited to forward-facing or rear-facing areas but also include side areas that are closer to the front than the rear, or vice versa, respectively. "Sides" of a vehicle are intended to refer to side-facing sections that are between the foremost and rearmost portions of the vehicle.

The invention claimed is:

1. A method of managing a fleet of vehicles, the method comprising, by a processor of a fleet management system:
receiving, from each vehicle of a fleet of vehicles, a vehicle identification number (VIN) for the vehicle, along with one or more data elements that comprise one or more of the following:
trip information comprising vehicle operational parameters gathered during a first run of the vehicle that was performed on behalf of a first entity, and
second trip information comprising second vehicle operational parameters gathered during a second run of the vehicle that was performed on behalf of a second entity;
generating a data block that comprises the VIN and the one or more data elements; and
saving the data block to a shared digital ledger that includes VINs and data elements for a plurality of the vehicles in the fleet of vehicles;
receiving a request from the first entity for trip information, authenticating the first entity,
using an access control policy to grant the first entity access to the first vehicle operational parameters but not the second vehicle operational parameters, and
presenting the first vehicle operational parameters to the first entity.

2. The method of claim 1 wherein:
the one or more data elements further comprise a software identification code that identifies the installed version of the software component; and
the method further comprises, by a deployment service of the fleet management system:
querying the shared digital ledger to return the installed version,
accessing a data set of available software component updates, and
in response to the installed version being older than a corresponding available software component update that is in the data set, transferring the corresponding available software component to the vehicle for installation to replace the installed version.

3. The method of claim 1 further comprising:
receiving an updated VIN for one of the vehicles;
generating a new data block that comprises the updated VIN and the VIN that was previously saved to the shared digital ledger for that vehicle; and
saving the data block to the shared digital ledger.

4. The method of claim 1 wherein:
the second vehicle operational parameters comprise an identifier and trip information for a first passenger who requested a ride from the second entity; and
using the access control policy to grant the first entity access to the first vehicle operational parameters but not the second vehicle operational parameters comprises ensuring that the first entity does not have access to the identifier and the trip information for the first passenger.

5. The method of claim 1 wherein:
the second vehicle operational parameters comprise a route taken by the vehicle during a delivery performed on behalf of the second entity; and
using the access control policy to grant the first entity access to the first vehicle operational parameters but not the second vehicle operational parameters comprises ensuring that the first entity does not have access to the route.

6. The method of claim 1, wherein the shared digital ledger is a permissioned ledger in which:
the fleet management system is permitted to access and save data to the shared digital ledger, and
the first entity and the second entity are permitted to access, but not save data to, the digital ledger.

7. The method of claim 1 wherein:
the one or more data elements further comprise the hardware identification code;
the hardware identification code identifies a sensor of the vehicle;
the one or more data elements also comprise current calibration information for the sensor of the vehicle; and
the method further comprises, by a processor:
  querying the shared digital ledger to return previous calibration information for the sensor of the vehicle, and
  in response to the current calibration information deviating from the previous calibration information by at least a threshold, causing a calibration action to be performed on the sensor.

8. The method of claim 1, wherein:
each vehicle gathers data that it periodically transfers to an external system; and
the one or more data elements comprise log information indicating a status of transfer of the gathered data to the external system.

9. A vehicle fleet management system comprising:
a processor; and
programming instructions that are configured to cause the processor to:
  receive, from each vehicle of a fleet of vehicles, a vehicle identification number (VIN) for the vehicle, along with one or more data elements that comprise one or more of the following:
    trip information comprising vehicle operational parameters gathered during a first run of the vehicle that was performed on behalf of a first entity, and
    second trip information comprising second vehicle operational parameters gathered during a second run of the vehicle that was performed on behalf of a second entity;
  generate a data block that comprises the VIN and the one or more data elements;
  save the data block to a shared digital ledger that includes VINs and data elements for a plurality of the vehicles in the fleet of vehicles;
  receive a request from the first entity for trip information,
  authenticate the first entity,
  use an access control policy to grant the first entity access to the first vehicle operational parameters but not the second vehicle operational parameters, and
  present the first vehicle operational parameters to the first entity.

10. The system of claim 9, further comprising additional programming instructions that are configured to cause a deployment service to:
  query the shared digital ledger to return an installed version of the software component;
  access a data set of available software component updates; and
  in response to the installed version being older than a corresponding available software component update that is in the data set, transfer the corresponding available software component to the vehicle for installation to replace the installed version.

11. The system of claim 9, further comprising additional programming instructions that are configured to cause the processor to:
  receive an updated VIN for one of the vehicles;
  generate a new data block that comprises the updated VIN and the VIN that was previously saved to the shared digital ledger for that vehicle; and
  save the data block to the shared digital ledger.

12. The system of claim 9, wherein:
the second vehicle operational parameters comprise an identifier and trip information for a first passenger who requested a ride from the second entity; and
the programming instructions to use the access control policy to grant the first entity access to the first vehicle operational parameters but not the second vehicle operational parameters comprise instructions to ensure that the first entity does not have access to the identifier and the trip information for the first passenger.

13. The system of claim 9, wherein:
the second vehicle operational parameters comprise a route taken by the vehicle during a delivery performed on behalf of the second entity; and
the programming instructions to use the access control policy to grant the first entity access to the first vehicle operational parameters but not the second vehicle operational parameters comprise instructions to ensure that the first entity does not have access to the route.

14. The system of claim 9, wherein the shared digital ledger is a permissioned ledger in which:
the fleet management system is permitted to access and save data to the shared digital ledger, and
the first entity and the second entity are permitted to access, but not save data to, the digital ledger.

15. The system of claim 9, wherein:
the one or more data elements further comprise the hardware identification code;
the hardware identification code identifies a sensor of the vehicle;
the one or more data elements also comprise current calibration information for the sensor of the vehicle; and
the system further comprises additional programming instructions that are configured to cause the processor to:
  query the shared digital ledger to return previous calibration information for the sensor of the vehicle, and
  in response to the current calibration information deviating from the previous calibration information by at least a threshold, cause a calibration action to be performed on the sensor.

16. The system of claim 9, wherein:
each vehicle is configured to gather data that it periodically transfers to an external system; and
the one or more data elements comprise log information indicating a status of transfer of the gathered data to the external system.

17. A method of managing a fleet of vehicles, the method comprising, by a processor of a fleet management system:
receiving, from each vehicle of a fleet of vehicles, a vehicle identification number (VIN) for the vehicle, along with one or more data elements that comprise a hardware identification code that identifies a sensor of the vehicle;
generating a data block that comprises the VIN and the one or more data elements that comprise current calibration information for the sensor of the vehicle;
saving the data block to a shared digital ledger that includes VINs and data elements for a plurality of the vehicles in the fleet of vehicles;

querying the shared digital ledger to return previous calibration information for the sensor of the vehicle; and in response to the current calibration information deviating from the previous calibration information by at least a threshold, causing a calibration action to be performed on the sensor.

18. The method of claim 17 wherein:

the one or more data elements further comprise a software identification code that identifies the installed version of the software component; and the method further comprises, by a deployment service of the fleet management system:

querying the shared digital ledger to return the installed version,     accessing a data set of available software component updates, and     in response to the installed version being older than a corresponding available software component update that is in the data set, transferring the corresponding available software component to the vehicle for installation to replace the installed version.

19. The method of claim 17 further comprising:

receiving an updated VIN for one of the vehicles;

generating a new data block that comprises the updated VIN and the VIN that was previously saved to the shared digital ledger for that vehicle; and saving the data block to the shared digital ledger.

20. The method of claim 17, wherein:

each vehicle gathers data that it periodically transfers to an external system; and the one or more data elements comprise log information indicating a status of transfer of the gathered data to the external system.

21. A vehicle fleet management system comprising:

a processor; and programming instructions that are configured to cause the processor to:

receive, from each vehicle of a fleet of vehicles, a vehicle identification number (VIN) for the vehicle, along with one or more data elements that comprise a hardware identification code that identifies a sensor of the vehicle,     generate a data block that comprises the VIN and the one or more data elements that comprise current calibration information for the sensor of the vehicle,     save the data block to a shared digital ledger that includes VINs and data elements for a plurality of the vehicles in the fleet of vehicles,     query the shared digital ledger to return previous calibration information for the sensor of the vehicle, and     in response to the current calibration information deviating from the previous calibration information by at least a threshold, cause a calibration action to be performed on the sensor.

22. The system of claim 21, further comprising additional programming instructions that are configured to cause a deployment service to:

query the shared digital ledger to return an installed version of the software component;

access a data set of available software component updates; and     in response to the installed version being older than a corresponding available software component update that is in the data set, transfer the corresponding available software component to the vehicle for installation to replace the installed version.

23. The system of claim 21, further comprising additional programming instructions that are configured to cause the processor to:

receive an updated VIN for one of the vehicles;

generate a new data block that comprises the updated VIN and the VIN that was previously saved to the shared digital ledger for that vehicle; and     save the data block to the shared digital ledger.

\* \* \* \* \*